(12) United States Patent
Seem et al.

(10) Patent No.: US 6,408,228 B1
(45) Date of Patent: Jun. 18, 2002

(54) HYBRID FINITE STATE MACHINE ENVIRONMENTAL SYSTEM CONTROLLER

(75) Inventors: John E. Seem; Gaylon M. Decious, both of Shorewood; Carol Lomonaco, Wauwatosa; Alex Bernaden, Greenfield, all of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/374,569

(22) Filed: Aug. 13, 1999

Related U.S. Application Data

(63) Continuation of application No. 08/892,177, filed on Jul. 14, 1997, now Pat. No. 6,006,142.

(51) Int. Cl.[7] ............................................. G05B 13/00
(52) U.S. Cl. ........................... 700/276; 700/41; 700/42; 700/83
(58) Field of Search ........................... 700/1, 276, 278, 700/282, 11, 12, 18–20, 27, 40–42, 52, 75, 83; 165/248–251, 255, 59, 253, 201, 254; 236/10, 49.31, DIG. 8; 237/3, 2 A; 454/43, 229; 62/129, 155, 159, 160

(56) References Cited

U.S. PATENT DOCUMENTS

| 4,897,798 A | 1/1990 | Cler ........................... 364/505 |
| 5,103,391 A | 4/1992 | Barrett ........................ 364/133 |
| 5,355,305 A | 10/1994 | Seem et al. .................. 364/161 |
| 5,537,339 A | 7/1996 | Naganuma et al. .......... 364/550 |
| 5,555,195 A | 9/1996 | Jensen et al. ........... 364/551.01 |
| 5,555,509 A | 9/1996 | Dolan et al. ................. 364/505 |
| 5,581,478 A | 12/1996 | Cruse et al. ................. 364/505 |
| 5,790,898 A | 8/1998 | Kishima et al. ............. 365/899 |
| 5,791,408 A | 8/1998 | Seem .......................... 165/250 |
| 5,819,845 A | * 10/1998 | Ryu et al. .................... 165/254 |
| 6,006,142 A | * 12/1999 | Seem et al. .................. 700/276 |

OTHER PUBLICATIONS

Ogunnaike et al., *Process Dynamics, Modeling, and Control*, Oxford University Press, 1994 p. 583.
Astrom and Hagglund, *PID Controllers*, 2$^{nd}$ Edition, Intn'l Society for Measurement and Control, 1995, p. 292.
Levine, *The Control Handbook*, CRC Press and IEE Press, 1996, pp. 323–328 & 343.
EPRI International Conference on Sustainable Thermal Energy Storage, Aug. 7–9, 1996 pp. 92–98.

* cited by examiner

*Primary Examiner*—Leo Picard
*Assistant Examiner*—Steven R. Garland
(74) *Attorney, Agent, or Firm*—Foley & Lardner

(57) ABSTRACT

The present invention provides a sequencing control strategy for environmental system controllers that takes better advantage of the capabilities of the system elements to enhance performance and reduce operating costs. Digital controller technology is included and operates in accordance with a state transition diagram clarifying conditions that must exist for the environmental controller to switch from one mode of operation to another (e.g., from a cooling mode with dampers set at the minimum position to a cooling mode with the dampers modulating to reduce the energy used for mechanical cooling). Several a controllers, or a single controller operating on several sets of control parameters, sequentially operate in accordance with transition data and system performance characteristics for controlling system operation.

18 Claims, 12 Drawing Sheets

| SYSTEM VARIABLES | | | |
|---|---|---|---|
| Qbldg 5.32 | Tbwr 44.34 | | |
| Qchiller .27 | Tbws 44.11 | 43.92 | TbwsSP |
| | Tbldg 39.72 | 40.00 | TbldgSP |
| Qtank 5.05 | ICE VALVE 43.50 | | |
| | GPM 30.00 | | |
| ELECTRIC LOAD 19.05 | FORECASTED LOAD 48.60 | | |
| DEMAND TARGET 249.86 | ICE INVENTORY 47.25 | | |

STATES | PLOT | CLOSE

FIG. 11

HYBRID FINITE STATE MACHINE ENVIRONMENTAL SYSTEM CONTROLLER

CROSS-REFERENCE TO RELATED APPLICATIONS

This is a continuation of patent application Ser. No. 08/892,177, now U.S. Pat. No. 6,006,142, filed Jul. 14, 1997.

This application is related to commonly-assigned U.S. Pat. No. 5,768,121, issued Jun. 16, 1998, and entitled: "Adaptive Flow Controller for use with a Flow Control System," and to U.S. Pat. No. 5,875,109, issued Feb. 23, 1999, and entitled "Adaptive Flow Controller for use with a Flow Control System," the disclosures of which are hereby expressly incorporated herein by reference.

FIELD OF THE INVENTION

This invention relates generally to environmental control systems for heating, ventilating and air conditioning (HVAC) applications and more particularly, to a system and method of controlling elements of an environmental control system.

BACKGROUND OF THE INVENTION

Environmental control systems such as heating, ventilating and air conditioning (HVAC) systems are well known and are designed and implemented to maintain environmental conditions within buildings. A typical installation sees the building divided into zones, and the HVAC system is adapted to maintain each of the zones within predefined environmental parameters (e.g., temperature, humidity, outdoor-recirculated air ratio, etc.). In this exemplary installation, an air distribution system connects each of the zones with an air handling unit (AHU) for providing a supply of conditioned air to the zones.

The AHU generally includes elements for introducing outdoor air into the system and for exhausting air from the system; elements for heating, cooling, filtering and otherwise conditioning the air in the system; and elements for circulating the air within the air distribution system at a desired flow rate. The AHU also includes a controller to control the operation of these elements. A primary task of the AHU is to provide supply air to each of the particular zones to offset the thermal loads imposed on the zone to maintain a comfortable environment for the occupants. Because thermal loads for the zones can vary markedly, it is common for an AHU to be controlled to maintain the supply air temperature at a setpoint value that is sufficiently-low to satisfy the zone with the largest load at any given time. If needed, the air stream is throttled and/or reheated at terminal boxes to provide adequate comfort in all zones.

AHU controllers commonly use sequencing logic to determine the most economic way to utilize the elements of the AHU to minimize the cost of maintaining the supply air temperature at the setpoint value. For instance, it is not uncommon for a building subjected to large daily temperature swings to require mechanical heating in the morning and mechanical cooling in the afternoon. Costs associated with mechanical cooling can be reduced using economizer cycle control. Economizer cycle control involves modulating dampers located in the mixing box to control the amount of outdoor air that is introduced to the AHU. Under the proper outdoor air conditions and economizer cycle control, the supply air temperature can be maintained at. the setpoint value without the use (or with reduced use) of mechanical cooling.

Economizer cycle control logic typically involves a comparison of the outdoor and return air temperatures or enthalpies. If the outdoor air temperature is greater than some minimum value and less than the return air temperature, an opportunity exists to reduce mechanical cooling costs.

On the surface, sequencing logic and economizer control are quite intuitive. In practice, however, the logic can be very difficult to follow and just as challenging to implement because of numerous exceptional cases (e.g., freeze control, etc.) that must be addressed. This was especially true with pneumatic control systems. It has been demonstrated for pneumatic control systems of actual AHUs that the outdoor air damper and heating coil valve may cycle between fully open and fully closed approximately every two minutes. This wastes energy and leads to excessive component wear. The advent of digital control has done little to improve the situation because, rather than taking full advantage of the programming capabilities of digital controllers, logic used in pneumatic controllers has simply been adapted to the digital controllers.

SUMMARY OF THE INVENTION

The present invention provides a sequencing control strategy for environmental system controllers that takes better advantage of the capabilities of the system elements to enhance performance and reduce operating costs. Digital controller technology is included and operates in accordance with a state transition diagram clarifying conditions that must exist for the environmental controller to switch from one mode of operation to another (e.g., from a cooling mode with dampers set at the minimum position to a cooling mode with the dampers modulating to reduce the energy used for mechanical cooling). Several controllers sequentially operate in accordance with transition data (the state transition diagram) and in response to system performance characteristics for controlling system operation.

In a preferred embodiment of the present invention, the environmental control system includes several controllers each optimized for controlling an associated one of the environmental system elements. In accordance with state transition logic retained in memory and accessed by the controllers, system control is passed between the controllers depending on the required operating mode in view of measured system performance data.

In an alternate preferred embodiment of the present invention, the environmental control system includes a single controller adapted to access one of several sets of control parameters each of which is optimized for controlling an associated one of the environmental control system elements. In accordance with state transition logic, the controller operates a preferred set of control parameters depending on the required operating mode in view of measured system performance data.

In still an additional preferred embodiment of the present invention a user interface including a representation of the state transition logic enhances system operation. The interface allows simplified viewing of system operation and faults. In addition, the interface provides a vehicle for simplified system modification.

These and other advantages and features of the present invention will be readily appreciated by one of ordinary skill in the art from the following detailed description of the preferred embodiments, the subjoined claims and the attached figures.

BRIEF DESCRIPTION OF THE DRAWINGS

FIG. 11a further representation of a graphic user interface in accordance with a preferred embodiment of the present invention.

DETAILED DESCRIPTION OF THE PREFERRED EMBODIMENTS

Figure 1:
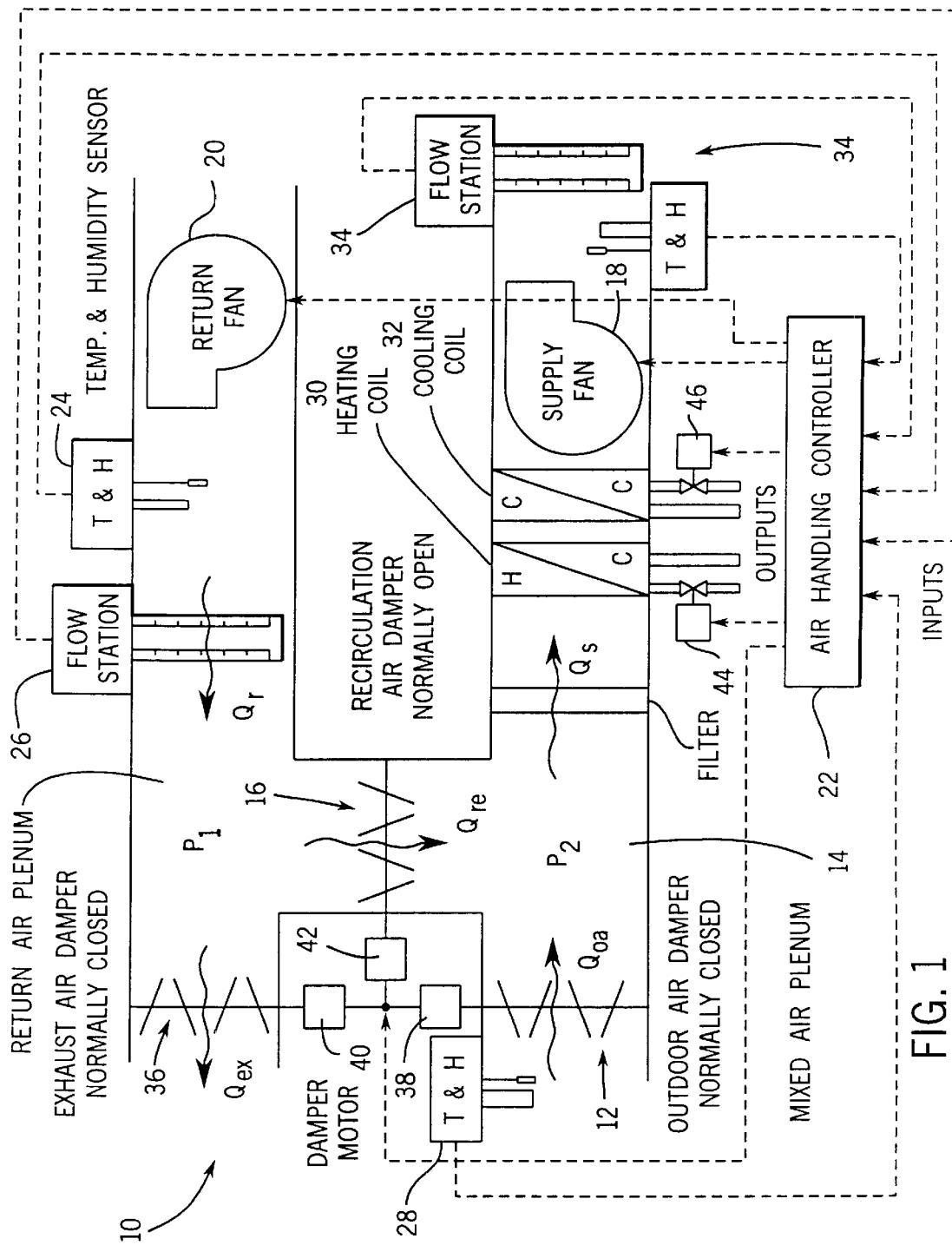
FIG. 1 is a schematic diagram of an air handling unit (AHU)

The present invention will be described in terms of several preferred embodiments. It should be understood from the outset that the present invention has a wide range of applications extending far beyond the examples described herein. Referring then to FIG. 1 the components of the schematically illustrated AHU 10 used to maintain the supply air temperature at the setpoint value are shown. This is done for simplicity and should in no way imply that the invention is limited to these elements.

Air enters AHU 10 through the outdoor air damper 12 and, depending on the mixing box 14 damper settings (controlling the positions of outdoor air damper 12, exhaust air damper 36 and recirculation damper 16 via actuation of damper motors 38, 40 and 42, respectively), may be mixed with air passing through the recirculation air damper 16. Air within AHU 10 is circulated by supply fan 18 and return fan 20, respectively. The temperatures and flow rates of the outdoor and recirculation air streams will determine the conditions of the supply air exiting mixing box 14. The return air temperature/humidity and flow are measured by temperature/humidity sensor 24 and flow sensor 26. The outdoor air temperature/humidity is measured by temperature/humidity sensor 28. The air exiting mixed air plenum 14 passes through heating coil 30 and cooling coil 32. At most only one of the two coils will be active at any given time assuming the sequencing control strategy is implemented properly and there are no valve leaks or other faults in the system. After being conditioned, the air is distributed to the zones through the supply air ductwork 34. The supply air temperature is measured downstream of the supply fan 18 by temperature/humidity sensor 36. Return air is drawn from the zones by the return fan 20 and is either exhausted or recirculated, depending once again on the position of the mixing box 14 dampers.

The air handling unit controller 22 includes a controller (or controllers) to control the heating coil valve 44, the cooling coil valve 46, and the damper motors 38–42, and control logic to determine the component(s) (heating coil, cooling coil, dampers, cooling coil and dampers) to use to maintain the supply air temperature at the setpoint value at any given time.

Figure 2:
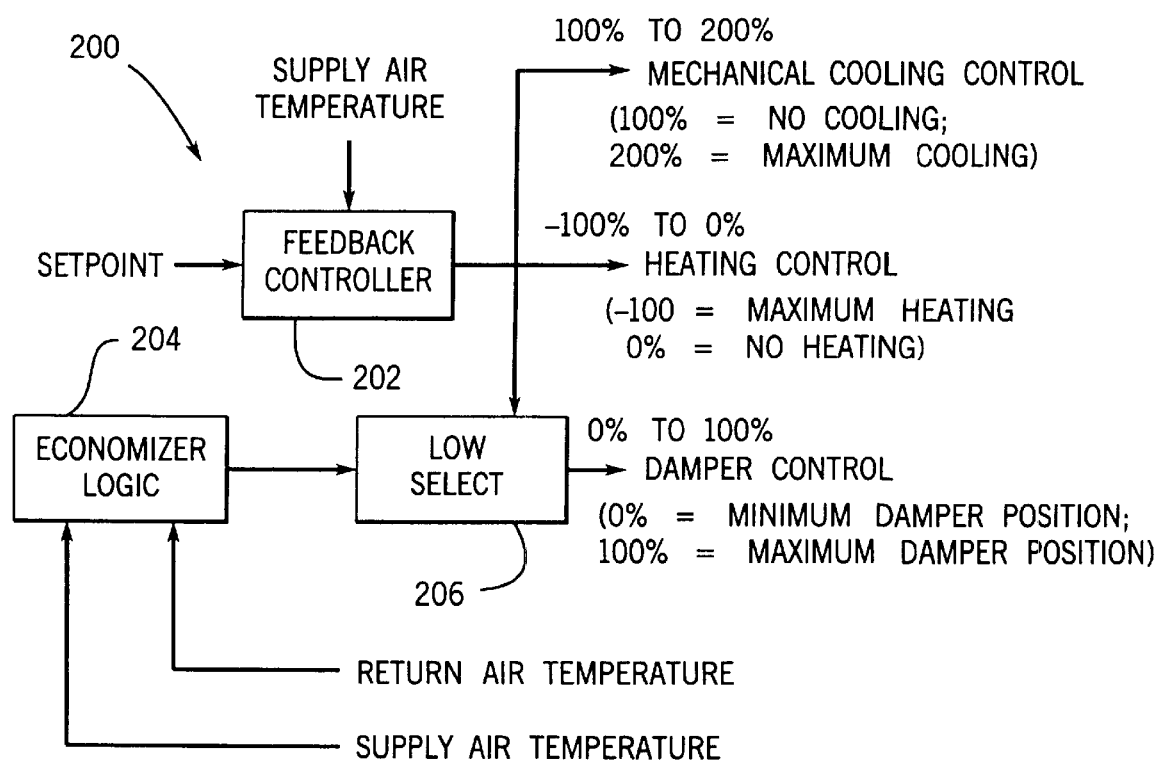
FIG. 2 is a block diagram illustrating a prior art AHU controller.

FIG. 2 shows a flow chart for a prior art sequencing control strategy 200 which may be implemented in the air handling unit controller 22 shown in FIG. 1. Control strategy 200 is based on strategies used in pneumatic control systems. A single feedback controller 202, usually a proportional-integral (P1) controller, is used with this strategy, in conjunction with economizer logic 204 and low select logic 206, to reduce component costs. The controller output is determined by comparing the supply air temperature to a setpoint. If the scaled output from feedback controller 202 is between 100% and 200%, mechanical cooling via cooling coil 32 is used to cool the air. Here 100% represents no mechanical cooling and 200% represents maximum mechanical cooling. If the outdoor air conditions are suitable, an economizer cycle 204 (outdoor air dampers fully open) is used simultaneously to reduce the mechanical cooling load. If the output from feedback controller 202 is between—100% and 0%, heating coil 30 is used to heat the supply air and the outdoor air damper is at its minimum position determined by ventilation criteria. If the output from the feedback controller is between 0% and 100%, outdoor air and return air are mixed in mixed air plenum 14 to produce supply air at the setpoint temperature. This is referred to as free cooling because neither mechanical heating or cooling is used.

The dynamic characteristics of the three processes (i.e., heating, cooling, and free cooling) are significantly different, in which case the use of a single feedback controller is limiting, To maintain stable control, the controller must to be tuned for the worst case conditions. If this is the case, the closed loop response for other conditions will tend to be sluggish. If the feedback controller is not tuned for the worst case conditions, then valves 44 and 46 and dampers 12, 16 and 36 may cycle between fully open and fully closed with resultant energy waste and component wear.

The control performance can be improved by using an adaptive controller such as disclosed and described in commonly assigned U.S. Pat. Nos. 5,355,305, 5,506,768 and 5,568,377 the disclosures of which are hereby expressly incorporated herein by reference, to adjust the proportional gain and integral time of controller 202. However, the parameters may need significant adjustment as the control component changes, that is, as the control changes from cooling to heating. Also, it may be difficult to tune at the transition region because the combined process may be very nonlinear. During the time period that the adaptive controller is adjusting parameters at the transition region, the control performance may be sacrificed.

Figure 3:
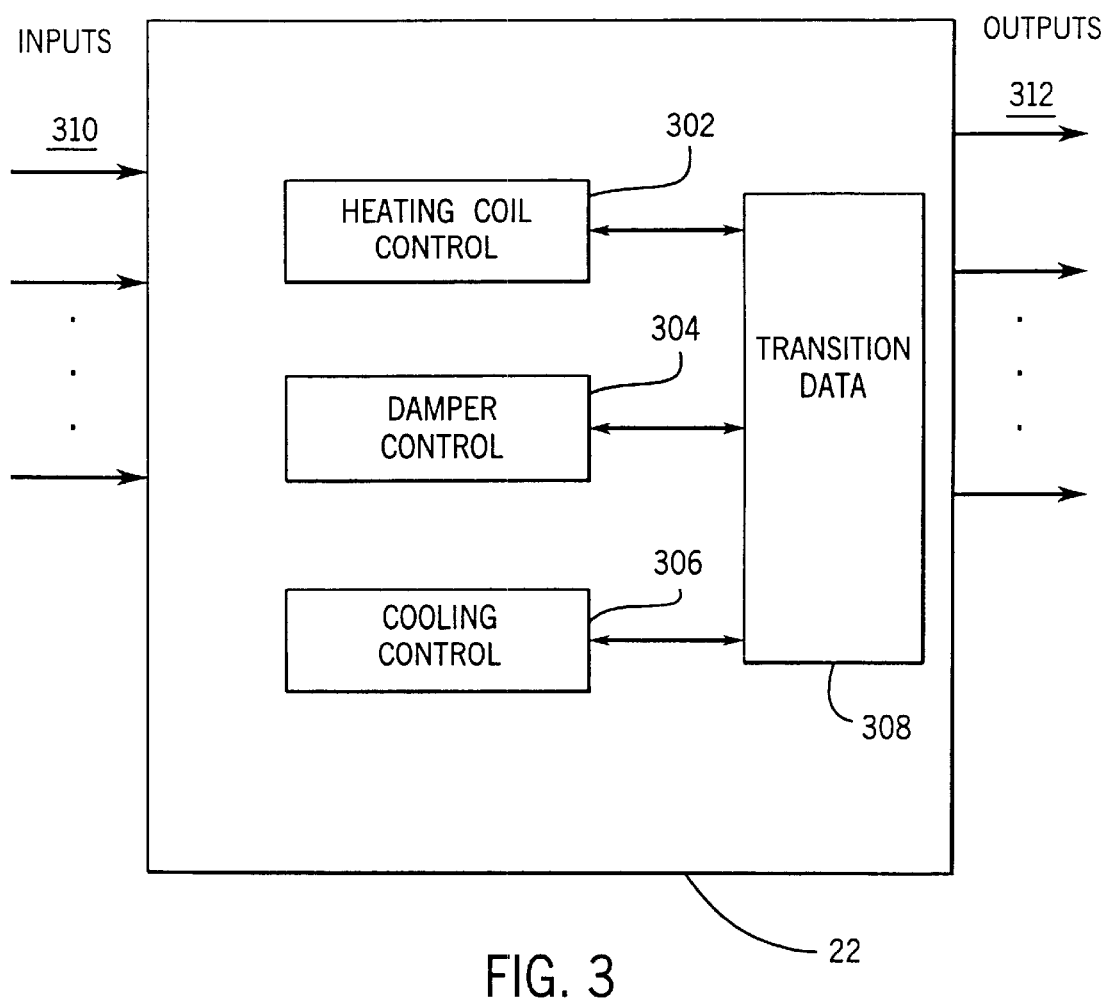
FIG. 3 is a block diagram illustrating an AHU controller in accordance with a preferred embodiment of the present invention.

With reference to FIG. 3, in accordance with a preferred embodiment of the present invention, an air handling unit controller 22 provides control of the supply air temperature using three separate feedback controllers 302, 304 and 306. Controller 302 is dedicated to controlling heating coil valve 44, controller 304 is dedicated to controlling cooling coil valve 46, and controller 306 is dedicated to controlling mixed air plenum 14 (i.e., damper motors 38–42 for controlling the positions of dampers 12, 16 and 36, respectively) in accordance with a set of control parameters. These control parameters are optimized for the particular control element, e.g., the parameters utilized by controller 302 are optimized for heating coil valve 44 control. At any given time, only one controller is operating. Each of controllers 302–306 are coupled to and access a memory in which transition data 308 is retained defining the transitions between operating modes, and hence which of the controllers are actively operating. Air handling unit controller 22 receives system performance data via inputs 310, and in accordance with transition data 308 defining which controller is operating, provides control outputs 312 for controlling the system operation.

Figure 4:
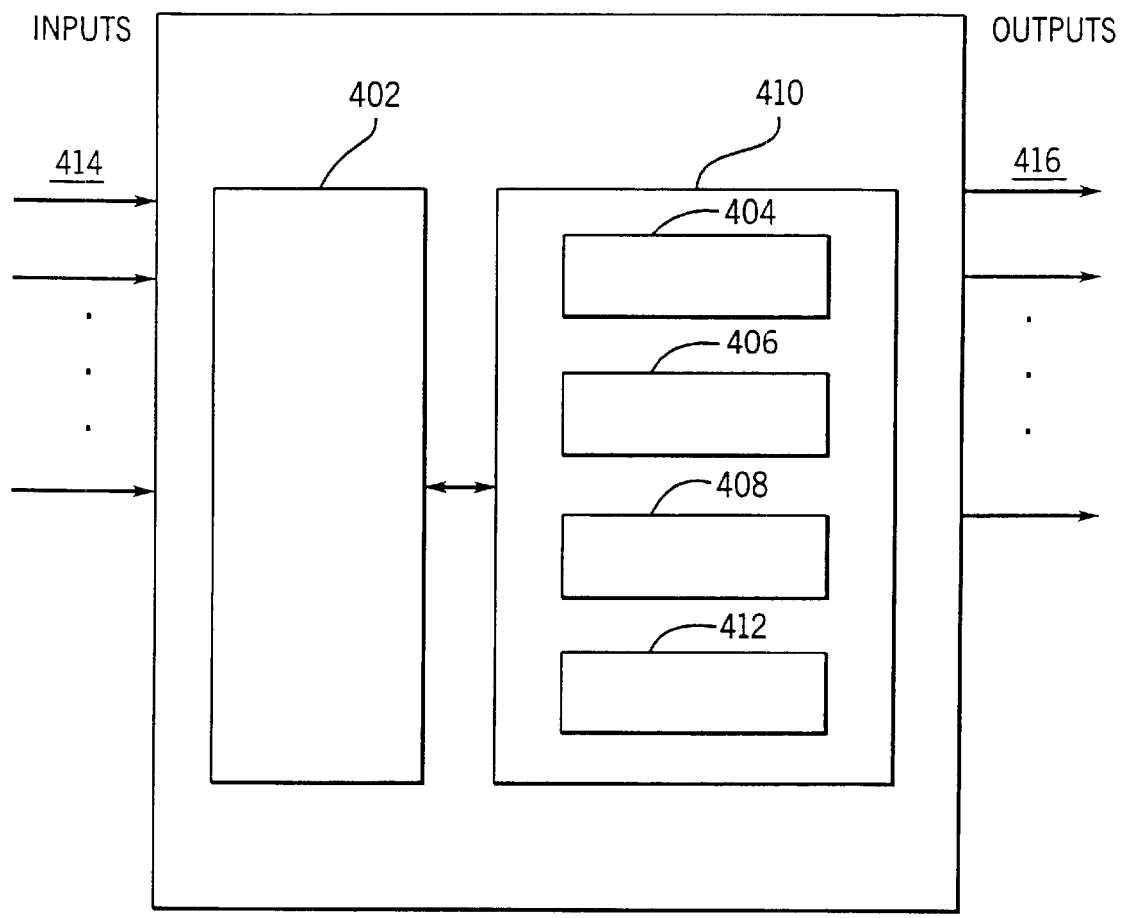
FIG. 4 is a block diagram illustrating an AHU controller in accordance with an alternate preferred embodiment of the present invention.

With reference to FIG. 4, an alternative preferred embodiment of air handling unit controller 22 sees the use of one controller 402 with three sets of controller parameters 404–408 corresponding to the various modes of operation retained in memory 410. Memory 410 also includes transition data 412 for defining transitions between operating modes, and hence which set of controller parameters are executed by controller 402. Controller 22 receives system performance data-via inputs 414, and in accordance with the transition data 412 defining which controller is operating, provides control outputs, 316 for controlling the system operation.

Figure 5:
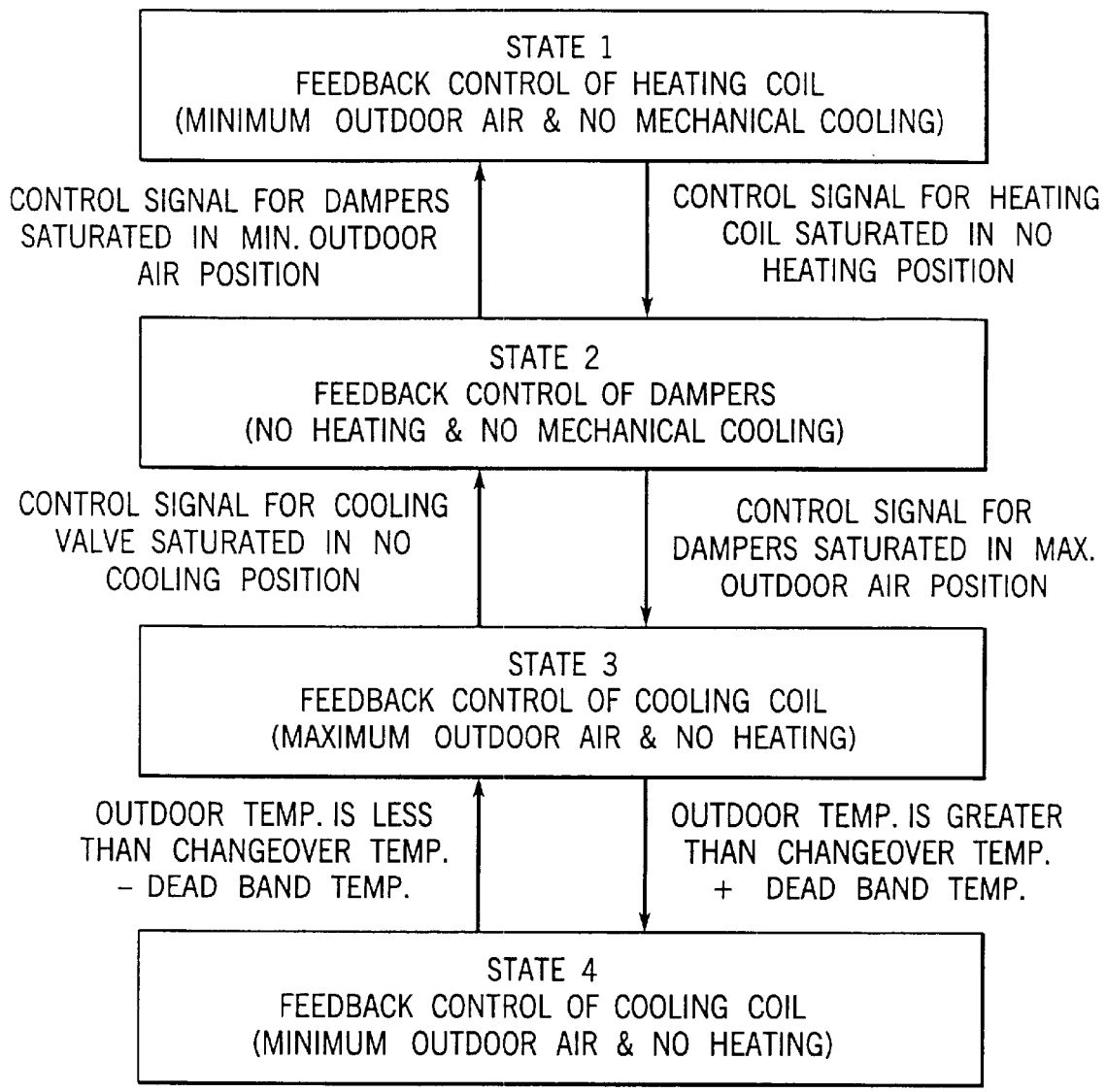
FIG. 5 is a diagram illustrating the state transition data in accordance with a preferred embodiment of the present invention.

FIG. 5 shows a state transition diagram illustrating transition data 308/412 and the controller parameters associated with the operating modes, respectively, in accordance with either preferred implementation. The states shown in FIG. 5 are described below.

State 1

In State 1, feedback control is used to modulate the flow of hot water to the heating coil 30 via valve 44, thereby controlling the amount of energy transferred to the air. Meanwhile, the mixing box dampers (12, 16 and 36) are positioned for the minimum outdoor air required for ventilation and the cooling coil valve 46 is closed. The transition to State 2 occurs after the control signal has been saturated at the no heating position for a time period equal to the state transition delay. For all state transitions, the current state must be continuously saturated at either its minimum or maximum limit for a period of time equal to the state transition delay before operation can switch to a new state.

State 2

In State 2, feedback control is used to adjust the position of dampers 12, 16 and 36 in order to maintain the supply air temperature at the setpoint value. Adjusting the positions of dampers 12, 16 and 36 varies the relative proportion of outdoor air and return air in the supply air stream. In State 2, the heating and cooling coil valves 44 and 46 are closed. Transition to State 1 occurs after the control signal for the dampers has been at the minimum outdoor air position for a time period equal to the state transition delay. Transition to State 3 occurs after the control signal for the dampers has been at the maximum outdoor air position for a time period equal to the state transition delay.

State 3

In State 3, feedback control is used to modulate the flow of cold water to the cooling coil 32 via valve 46, thereby controlling the amount of energy extracted from the air. The outdoor air damper 12 is set at completely open and the heating coil valve 44 is closed. Transition to State 2 occurs after the control signal for mechanical cooling has been saturated at the no cooling position for a time period equal to the state transition delay. Economizer logic is used to determine the transition to State 4. Either an enthalpy based or temperature based economizer logic can be used. In the state diagram shown in FIG. 3, logic based on outdoor air temperature is used to determine the transition point. Transition to State 4 occurs when the outdoor air temperature is greater than the changeover temperature plus the deadband temperature. As an example, the changeover temperature could equal the return air temperature, and the deadband could equal 0.56° C. The purpose of the deadband temperature is to prevent cycling from State 3 to State 4 due to noise in the return and/or outdoor air temperature sensors, 24 and 28 respectively, readings.

State 4 also uses feedback control to modulate the flow of cold water to the cooling coil 32 via valve 46, thereby controlling the amount of energy extracted from the air. However, in this case, the outdoor air damper 12 is set at the minimum outdoor air position. Economizer logic is used to determine the transition to State 3. In the state diagram shown in FIG. 3, transition to State 3 occurs when the outdoor air temperature is less than the changeover temperature minus the deadband temperature.

One of the main benefits of the present invention is that each of controllers 302–306 can be independently tuned for each control loop. Another advantage is that it could be used with a distributed control system. The current trend is towards using intelligent sensors and actuators that contain microprocessors.

Figure 6:
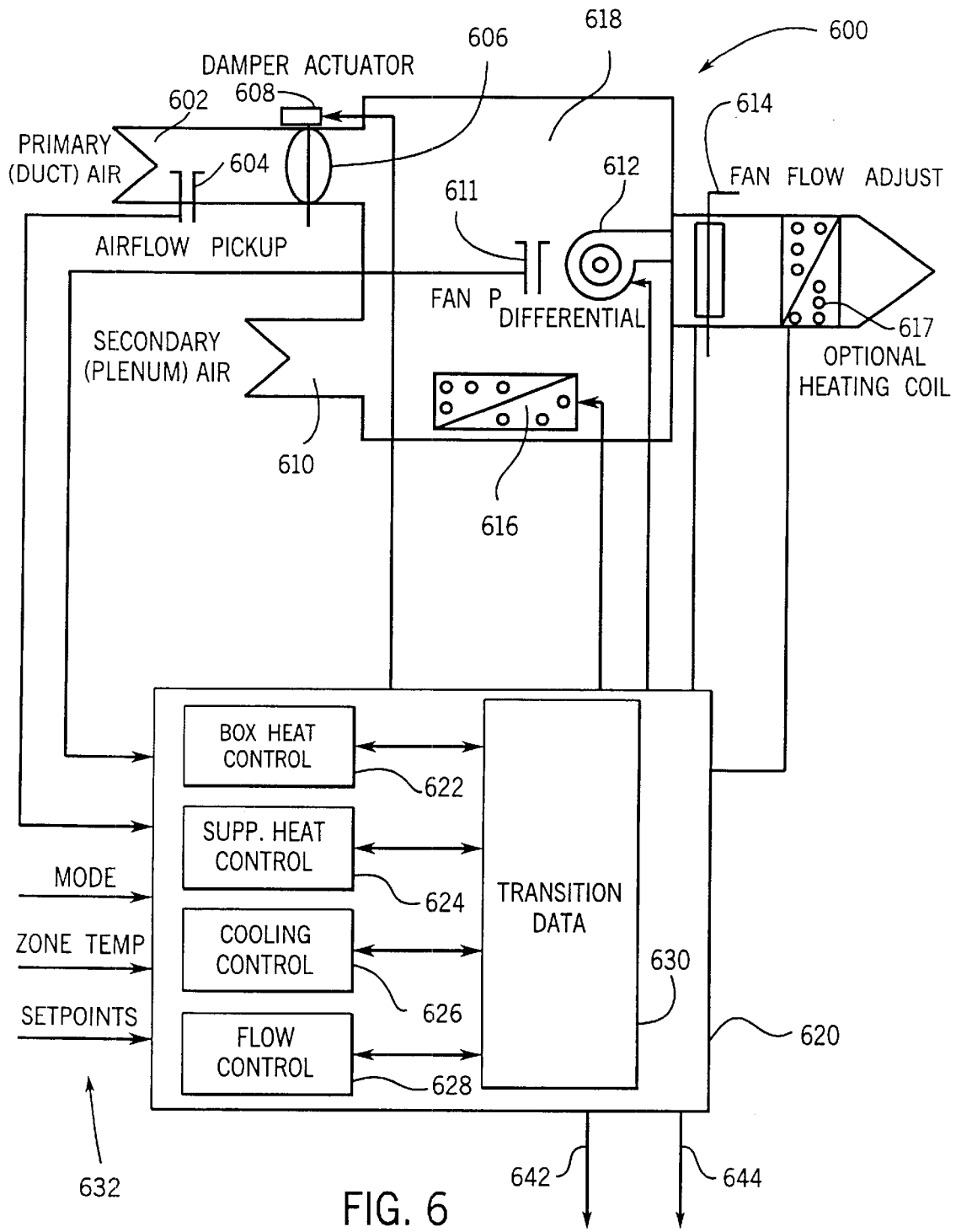
FIG. 6 is a block diagram illustrating a variable-air-volume (VAV) device adapted in accordance with the present invention.

For example, as shown in FIG. 6 a variable-air-volume (VAV) unit 600 is designed to maintain a constant supply air temperature setpoint and deliver a variable amount of air into a controlled area of a building to maintain the area at a desired temperature. VAV 600 is preferably an electromechanical device with a digital controller 620. It is shown for a single duct application with a series fan arrangement. It will be appreciated that the invention has application to other implementations of VAV unit 600. Having distributed digital control, VAV 600 may operate in a standalone manner, or may be coupled to a global control system through a network arrangement such as the Metasys Network system available from Johnson Controls, Inc. of Milwaukee, Wis. When coupled to a network, VAV 600 communicates using standard objects which reside within the VAV controller 620. In this manner, controller 620 may retain 'point' information which may be retrieve and viewed by a user at any user interface on the network. Preferably VAV 600 communicates through two ports 642 and 644, one for an N2 bus connection and one for an N3 bus, respectively. Moreover, when coupled to the network, VAV 600 is configurable through global tools with applications developed based upon standard objects, assembly objects and nested applications such provided in the Metasys Application Basic Programming Language available from Johnson Controls, Inc. Once the, application is created using the global tools, it may be downloaded to VAV 600 using an appropriate protocol such as BACnet.

With reference to FIG. 6, VAV 600 series fan 612 is, as observed, installed in series with the supply air stream. Variable air volume cold air is supplied into the fan chamber 618 from inlet duct 602 which is coupled to the air distribution system for the building for receiving supply air at the supply air temperature. Air flow sensor 604 provides supply air flow information, and damper 606 and damper actuator 608 act as a throttle for controlling the flow of supply air into VAV 600. For example, if cooling is not required, damper 606 may be adjusted to its minimum flow setting. Additional air is drawn from the plenum duct 610 which is coupled to receive air from the zone to maintain a relatively constant flow of air into the zone. Fan flow sensor 612 provides zone air flow information, and flow adjust damper 614 allows for control of the zone flow. Finally, should heat be required, heat coil box 616 may be activated to warm the air in fan chamber 616 and supplemental heat coil 617 may be activated for warming air as it flows into the zone.

With continued reference to FIG. 6, VAV controller 620 is implemented in accordance with the present invention as described above and includes a plurality of control elements 622–628 associated with each of the system elements. VAV controller 620 includes box heating controller 622, supplemental heating controller 624, cooling controller 626 and flow controller 628. Though each of these controllers is shown associated with controller 620, it should be understood that each may be implemented in a distributed fashion. That is, the specific controller may be associated with the system element itself. For example, box heating controller 622 may be implemented with box heating coil 616 without departing from the fair scope of the invention. As described, these control elements may be implemented as discrete controllers or may be implemented as a single controller acting on a number of sets of control parameters with a set being associated with each of the system elements. In addition, VAV controller 620 contains the transition data 630, preferably retained in memory within VAV controller 620, implementing the state transition logic illustrated in FIGS. 7a and 7b thereby determining the mode of operation based upon the current mode of operation, system performance data (i.e., flow rates and zone temperatures) and setpoints all shown generally as inputs 632.

Control elements 622–628 may implement any suitable control strategy, and preferably, implement a control strategy optimized to the system element being controlled. In the preferred embodiment, box heat controller 622, supplemental heat controller 624 and cooling controller each implement a proportional-integral-derivative feedback controller using the predictive adaptive control technology disclosed in the aforementioned commonly assigned United States Patents and United States Patent Application.

Figure 7A:
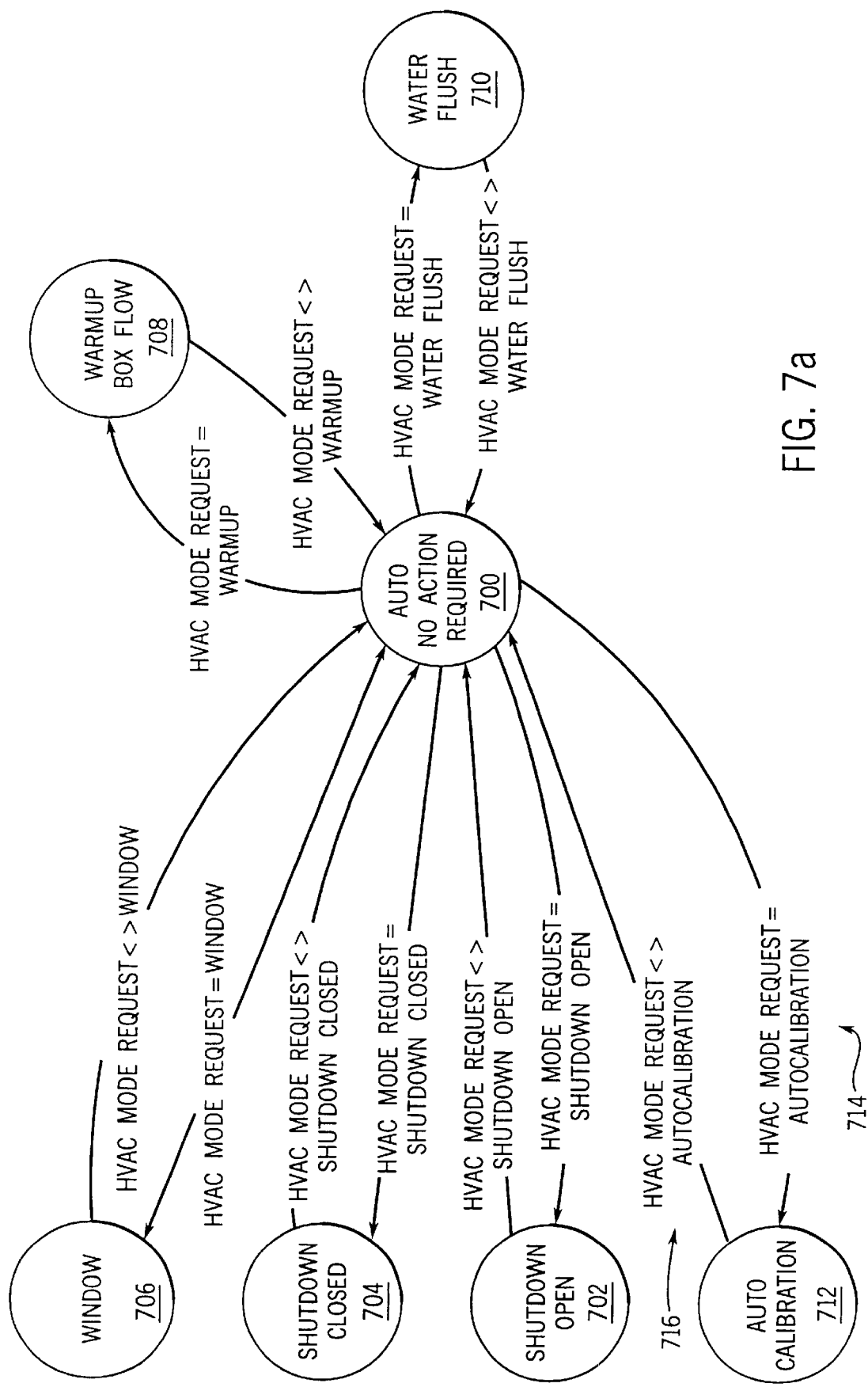
FIG. 7a is a diagram illustrating state transition data in accordance with a preferred embodiment of the present invention for use with the VAV device of FIG. 6.
Figure 7B:
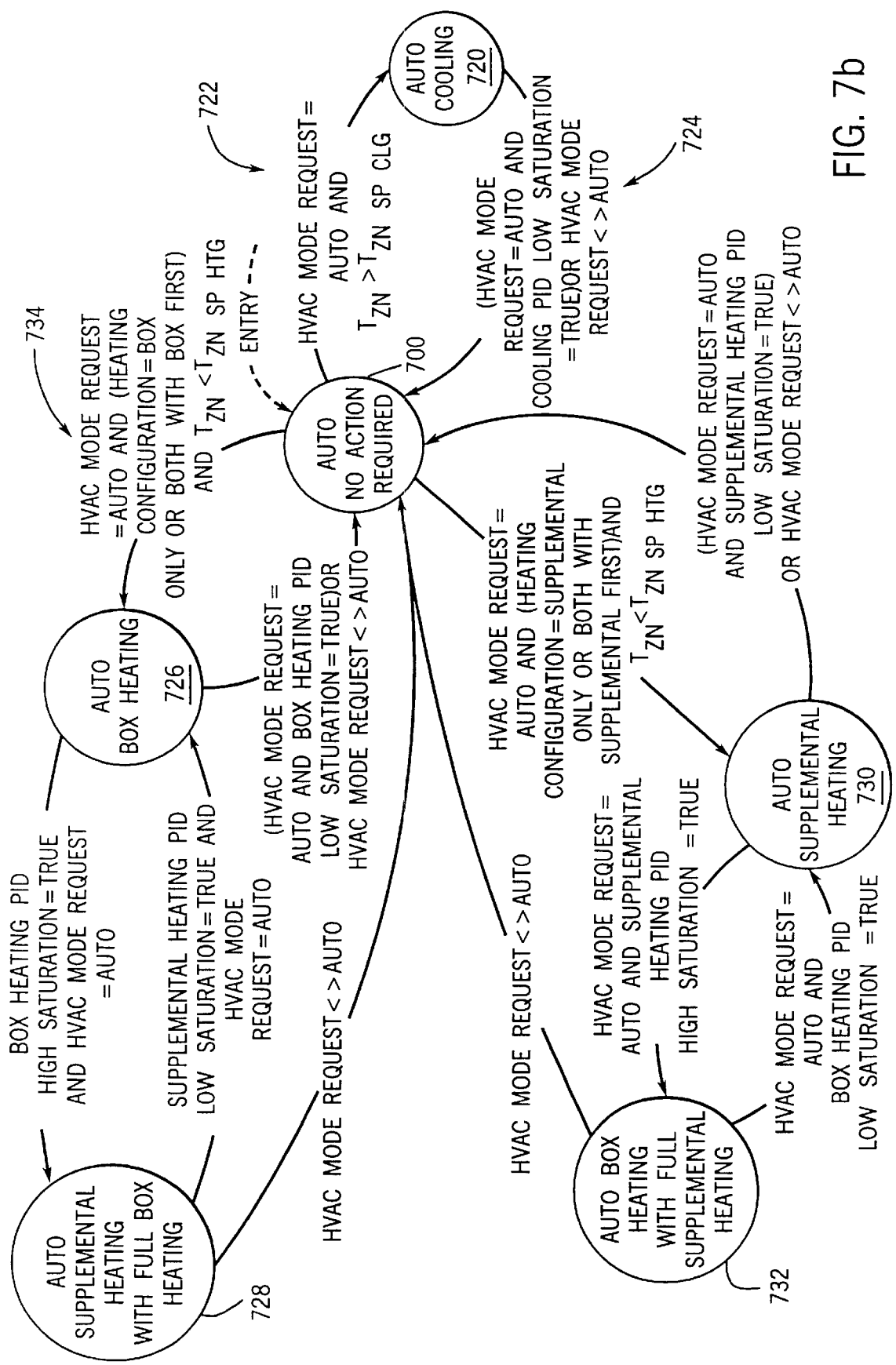
FIG. 7b is a diagram illustrating state transition data in accordance with a preferred embodiment of the present invention for use with the VAV device of FIG. 6.

Referring then to FIGS. 7a and 7b, illustrated is a nested control architecture in accordance with the preferred embodiments of the present invention. FIG. 7a illustrates the available modes of system operation and the transitions therebetween. FIG. 7b illustrates the operating states associated with the automatic operation mode and the transitions therebetween. A mode is selected by the system user, using a network interface or interfacing directly with controller 620, setting the "HVAC Mode Request" equal to the selected mode. This is illustrated in FIG. 7a as. a link, generally shown as 714, leading into a mode having the HVAC Mode Request set equal to the particular mode and a link, generally shown as 716, exiting a mode having the HVAC Mode Request set not equal to the particular mode. The following is a description of the possible modes:

In Auto mode 700, the controller runs automatically to meet the control objectives. Within Auto mode are multiple states. The user requests Auto mode for the VAV controller 620 and the process dynamics determine the current Auto state. For example, the current Auto state is Auto No Action Required when the zone temperature is greater than the heating zone temperature setpoint and the zone temperature is less than the cooling zone temperature setpoint. Each Auto state and the transitions between these states are shown in FIG. 7b.

Two shutdown options will be available: shutdown box open 702 and shutdown box closed 704. The damper actuator at the shutdown box open mode 702 will control flow rate to satisfy the occupied cooling maximum flow rate setpoint. At the shutdown box closed mode 704, the damper actuator will be driven to the full closed end stop. When either shutdown is enabled, all the devices that are associated with the outputs of the controller (fan, supplemental heat, box heat, and lighting) are turned off.

As a window is opened, a binary input signifies the open state of the window, the HVAC Mode Control is forced to the window mode 706. The window open status has the highest priority. Window mode 706 is similar to shutdown closed except it is dependent on a low limit temperature setpoint that will allow supplemental heat to operate. Upon the recognition of this mode, the damper is closed, fans are switched off and the supplemental heat is controlled to maintain the low limit temperature setpoint. In window mode 706, only the room temperature is monitored, the box heating is disabled, and supplemental heating is enabled if the temperature falls below the low limit setpoint. The HVAC Mode Control can also be forced to window mode 706 by a supervisory requested command.

In warmup mode 708, known as the central system warmup, the air handling unit provides warm air through the supply duct as needed to bring the system to normal occupied operating conditions. In warmup, the VAV flow setpoint action is reversed. During warmup, supplemental heat is always enabled, and the box heat and parallel fans are disabled by default.

Water flush mode 710 is typically used during the startup and commissioning of VAV controllers on a new jobsite for the flushing, balancing, or maintenance of building heating water systems. Incremental, proportional, and two position-normally open and normally closed-heating outputs are affected by this feature.

Autocalibration mode 712 will be performed every operator defined period within an application object. A counter, when expired, is used to initiate autocalibration. Autocalibration will turn the parallel or series box fan (if present) off. Autocalibration would drive the damper actuator closed for auto zero time, and calibrate the analog input flow sensor value based on zero flow. The autocalibration for each controller will be sequentially staggered so several controllers will not autocalibrate at the same time.

With reference now to FIG. 7b, the operating states of VAV unit 600 from the Auto mode 700 are shown. From the Auto mode 700 where no action is required, and with the HVAC Mode Request set equal to auto, VAV controller 620 will function without user intervention to meet the system performance criteria (user set points, energy consumption demands, flow requirements, etc.). A transition from a state, such as no action 700 to auto cooling 720, occurs when the transition conditions defined by the transition data and illustrated on the links joining the states, for example link 722, are met. Once a state is entered, for example once the system has entered auto cool 720, it will remain in that state until the transition conditions for exiting the state, for example as shown on link 724, are met. The operating states of VAV 600 include, in addition to no action 700 and auto cool 720, auto box heat 726, auto supplemental heating with full box heating 728, auto supplemental heating 730 and auto box heating with full supplemental heating 732. One can see that the operation of the system can be easily reconfigured. For example, should the user prefer box heating prior to supplemental heating by defining transition data 630 appropriately box heating 726 can be entered before supplemental heating 730, see for example link 734. The concept of the state diagram also assists the user in viewing operation of the system.

Figure 8:
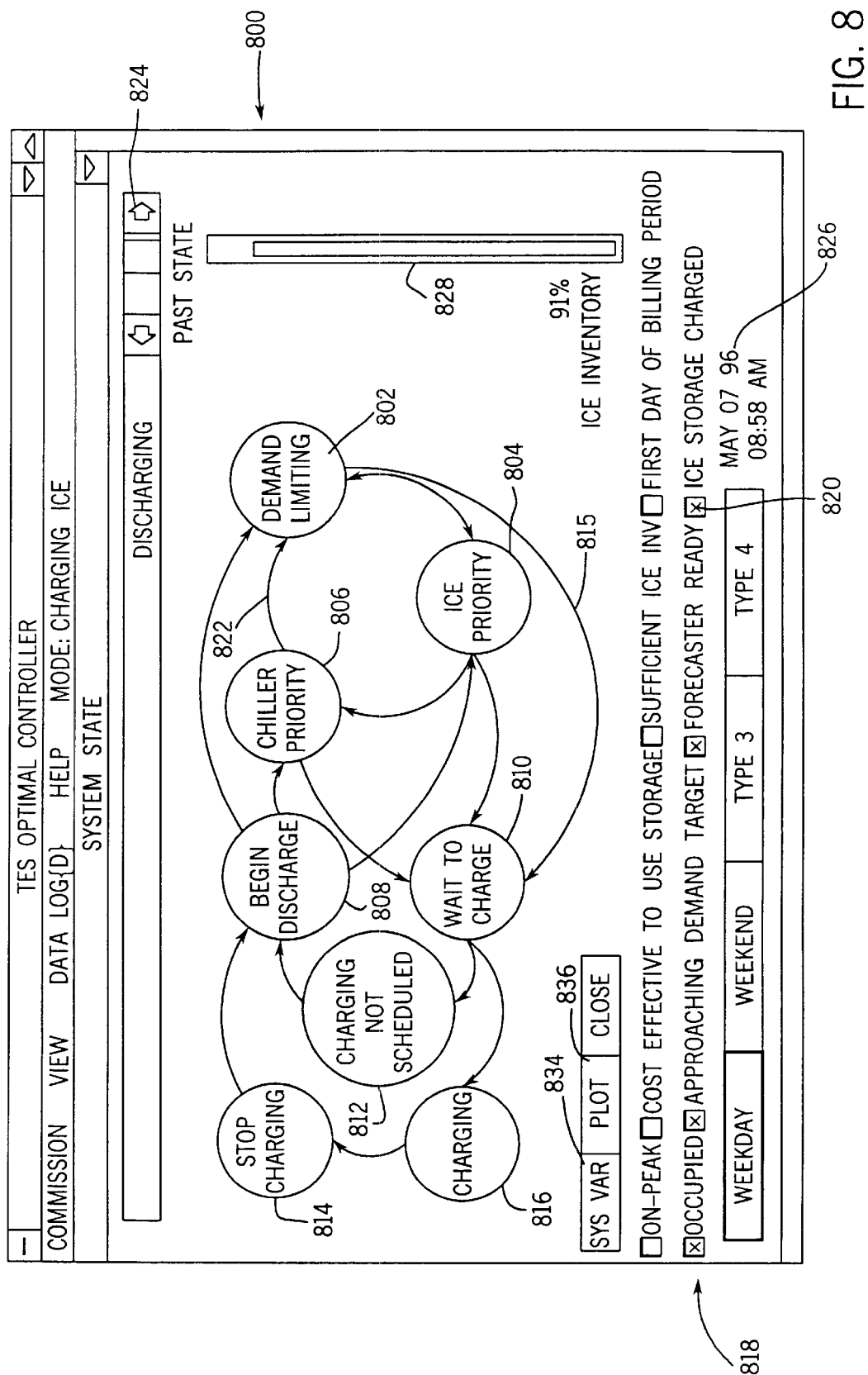
FIG. 8 is a representation of a graphic user interface in accordance with a preferred embodiment of the present invention.

With reference to FIGS. 8–11, a series of user interface displays are shown. In the preferred embodiment, the controller is part of networked environmental control system including user interfaces having screen display. The user, by selecting. the appropriate option, can retrieve the display shown in FIG. 8 showing current system mode of operation. Referring then to FIG. 8, the main portion of the window is a state transition diagram 800. State transition diagram 800 is representative of a system including mechanical as well as ice storage cooling sources. There are 8 basic modes of operation (or states) 802–816 that are represented as circles. Transitions between states are represented by the arrows, generally 815, connecting the circles 802–816. In each state unique actions are being taken to control the system as has been described. For example, FIG. 8 shows the controller in the Demand Limiting state 802. In this mode the controller uses both the chiller and ice storage to stay below a preset electric demand limit without depleting the ice storage prematurely. As the day progresses the various conditions indicated in field 818 may change, the status of the conditions being indicated by the check boxes 820. This in turn may cause the mode of operation to change. A change of state is indicated in the window by a thick arrow 822 going from the previous mode of operation to the current mode of operation. For example, FIG. 8 illustrates that when it was predicted that energy usage was "Approaching Demand Target", the corresponding box became checked, and the controller switched from the Chiller Priority mode 806 to the Demand Limiting mode 802.

A description 830 of the current mode of operation and why this mode was chosen 832 can be obtained by using an input device and selecting anywhere in the state transition diagram screen 800. Upon making the selection, a State Transition Description window, FIG. 9, displays the requested information.

Figure 9:
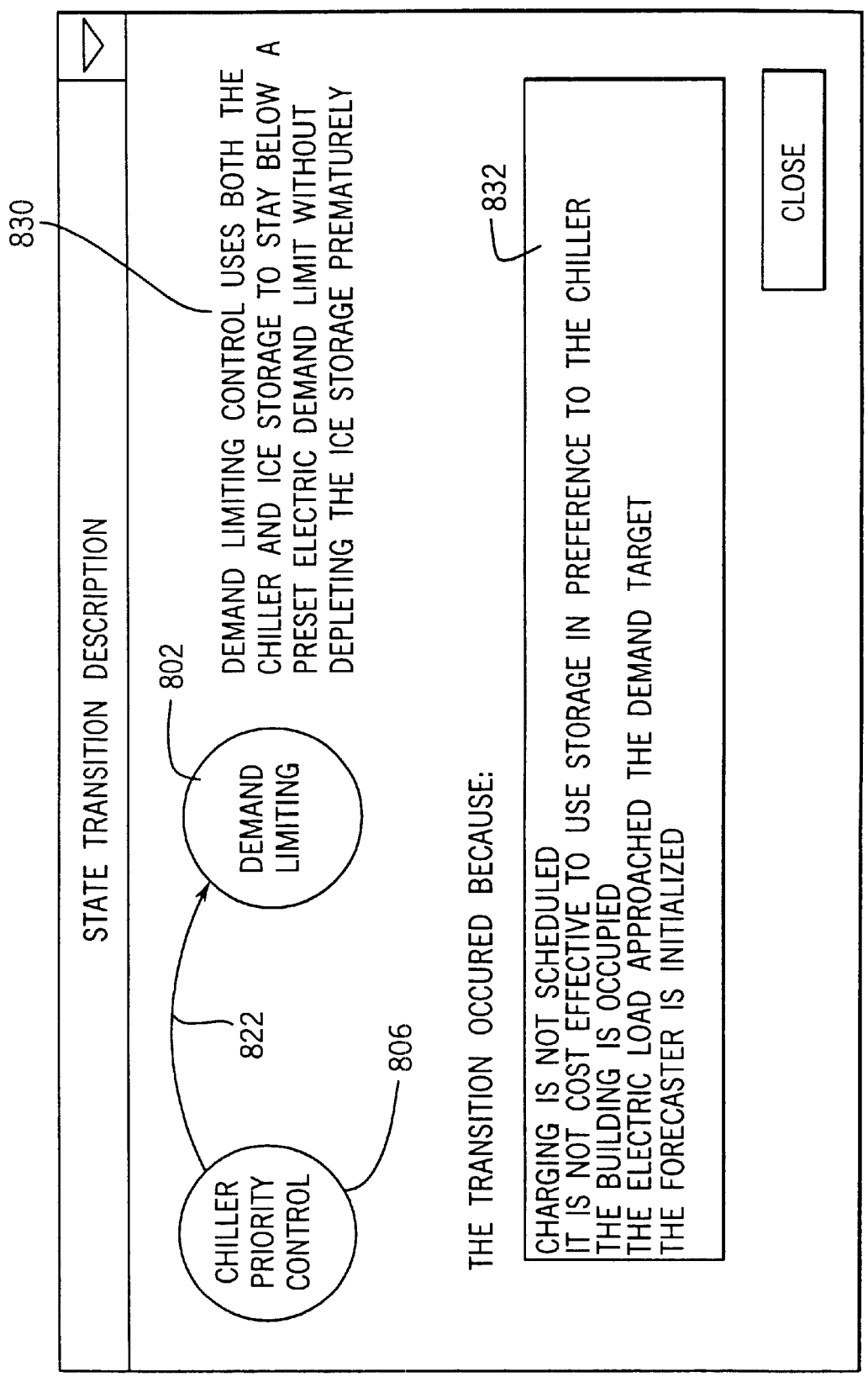
FIG. 9 is a further representation of a graphic user interface in accordance with a preferred embodiment of the present invention.
Figure 10:
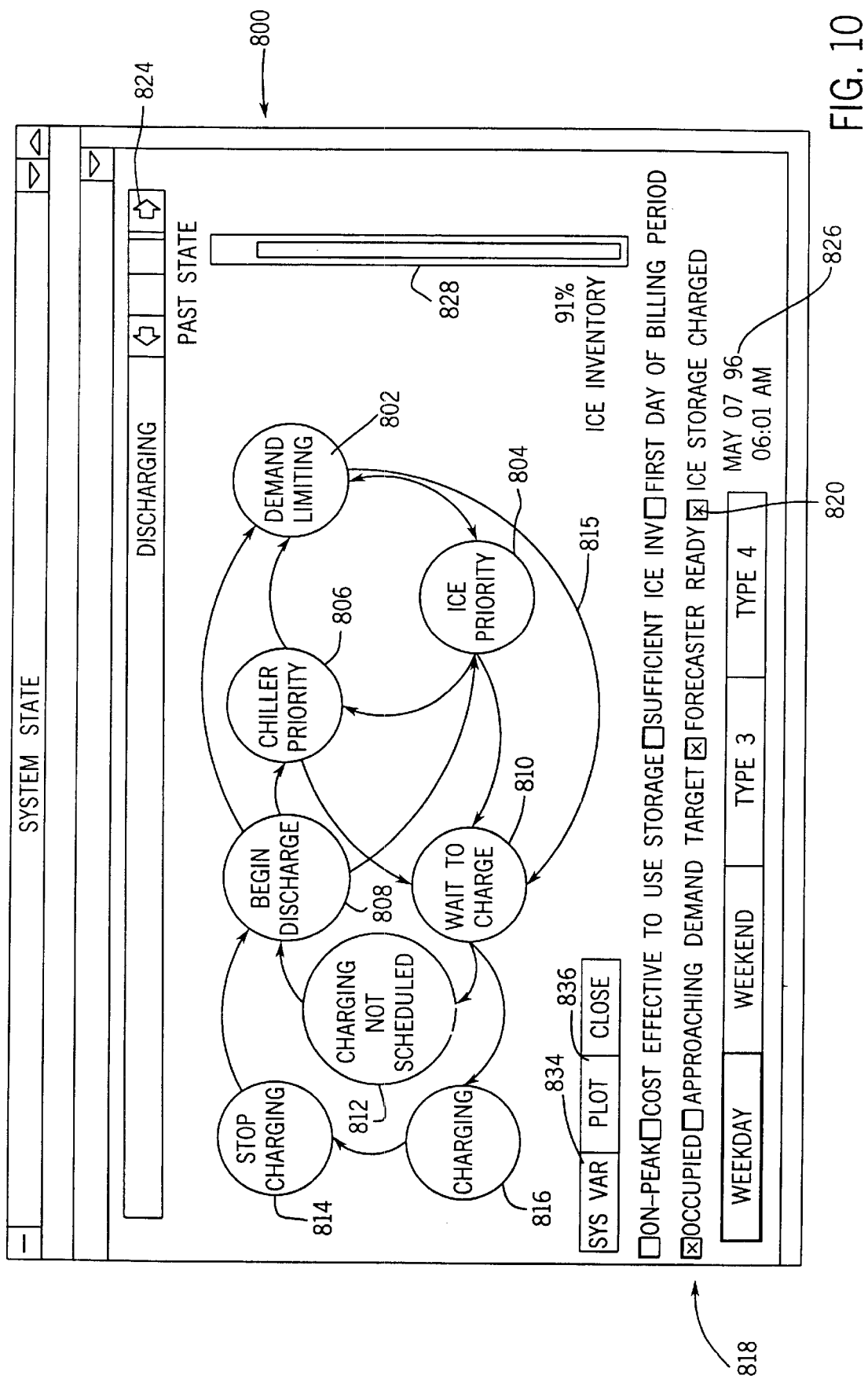
FIG. 10 is a further representation of a graphic user interface in accordance with a preferred embodiment the present invention.

One can view the previous modes of operation by moving the scroll bar 824 at the top right of the window. The caption underneath the scroll bar indicates what state (current or past) is displayed, for example, FIG. 10. The date and time information 826 at the bottom right of the window tells when the transition between the modes occurred. Field 818 with the check boxes 820 illustrates the conditions of the various critical flags that determine the mode of operation. The bar graph 828 to the right of the screen can show the status of a system element, for example a percent utilization, and in this example, shows the ice inventory at the time the change occurred. Likewise, selecting anywhere in this screen will retrieve a State Transition Description window, as shown in FIG. 9, for this previous state.

A Sys Var button 834 is provided and allows the user to retrieve and view the system variables, FIG. 11. If the current state is being displayed, the current system variables are displayed. Selecting the plot button 836, provides a plot of the system variables versus time or by transition as requested by the user. If a past state is being displayed, selecting the Sys Var button 834 displays the system variables values at that transition.

The present invention has been described in terms of preferred embodiments. Its many advantages, features and applications will be readily appreciated by one of ordinary skill in the art. Its fair scope is set forth the attached claims.

We claim:

1. In an environmental control system having a plurality of devices for altering a condition of an environment inside a building, a control system for operating the plurality of devices comprising:

a plurality of feedback controllers each operatively coupled to control a different one of the plurality devices and implementing one of a plurality of feedback control loops;

a finite state machine controller having a plurality of control states and responding to sets of transition data by determining which one of the plurality of control states is active at any given point in time, wherein the one of the plurality of control states that is active determines which of the plurality of controllers is active at that given point in time; and a memory for storing parameters for the plurality of feedback control loops, wherein the plurality of controllers operate in response to the control parameters read from the memory, and wherein the memory also stores the state transition data.

2. The control system as recited in claim 1 wherein at least one of the plurality of controllers implements a proportional-integral feedback control loop.

3. The control system as recited in claim 1 wherein at least one of the plurality of controllers implements a proportional-integral-derivative feedback control loop.

4. The control system as recited in claim 1 wherein the feedback loops are each associated with at least one of a heating coil, a damper, or a cooling coil.

5. The control system as recited in claim 4 wherein the finite controller is an air handling unit controller.

6. The control system as recited in claim 1 wherein one of the plurality of controllers operates a heating coil.

7. The control system as recited in claim 1 wherein one of the plurality of controllers operates a cooling coil.

8. The control system as recited in claim 1 wherein one of the plurality of controllers operates a damper.

9. The control system as recited in claim 1 wherein one of the plurality of controllers operates a supplemental heating device.

10. The control system as recited in claim 1 wherein one of the plurality of controllers operates a fan.

11. The control system as recited in claim 1 further comprising a display device coupled to receive data regarding operation of the finite state machine controller, the display device operable for representing each of the plurality of devices by a respective display element and each of the sets of transition data as a display link joining respective ones of the plurality of devices.

12. In an environmental control system having a plurality of devices for altering a condition of an environment inside a building, a control system for operating the plurality of devices comprising:

a plurality of feedback controllers each operatively coupled to control a different one of the plurality devices and implementing one of a plurality of feedback control loops;

a finite state machine controller having a plurality of control states and responding to sets of transition data by determining which one of the plurality of control states is active at any given point in time, wherein the one of the plurality of control states that is active determines which of the plurality of controllers is active at that given point in time; and a display device coupled to receive data regarding operation of the finite state machine controller, the display device operable for representing each of the plurality of control states by a respective display element and each of the sets of transition data as a display link joining respective ones of the control states, wherein the display device comprises a user input device for allowing a user to respectively select a given display element, and wherein the display device is operable to display data related to the feedback control loop associated with that given display element.

13. The environmental control system of claim 12 wherein the display device comprises a user input device for allowing a user to respectively select a display link and wherein the display device is operable to display an associated set of transition data.

14. The control system of claim 12 further comprising a memory for storing control parameters for the plurality of feedback control loops, wherein the plurality of controllers operate in response to the control parameters read from the memory, and wherein the memory also stores the state transition data.

15. A system for controlling an environmental control unit which has a plurality of devices for altering a condition of an environment inside a building, the system comprising:
- a plurality of controllers with each being operatively coupled to control the plurality devices and implementing one of a plurality feedback control loops which respond to performance of the environmental control unit;
- a finite state machine controller having a plurality of control states and responding to sets of transition data by determining which one of the plurality of control states is active at any given point in time, wherein which of the plurality of controllers is active at that given point in time is determined by the one of the plurality of control states that is active; and
- a memory for storing the sets of the transition data, wherein the memory also stores control parameters for the plurality of feedback control loops, and the plurality of controllers operate in response to the control parameters read from the memory.

16. The control system as recited in claim 15 wherein at least one of the plurality of controllers implements a proportional-integral feedback control loop.

17. A system for controlling an environmental control unit which has a plurality of devices for altering a condition of an environment inside a building, the system comprising:
- a plurality of controllers with each being operatively coupled to control the plurality of devices and implementing one of a plurality feedback control loops which respond to performance of the environmental control unit;
- a finite state machine controller having a plurality of control states and responding to sets of transition data by determining which one of the plurality of control states is active at any given point in time, wherein which of the plurality of controllers is active at that given point in time is determined by the one of the plurality of control states that is active; and
- a memory for storing the sets of the state transition data, wherein at least one of the plurality of controllers implements a proportional-integral-derivative feedback control loop.

18. The system of claim 17 wherein the memory stores sets of the state transition data, wherein the memory also stores control parameters for the plurality of feedback control loops, and the plurality of controllers operate in response to the control parameters read from the memory.

* * * * *